United States Patent
Pinarbasi

(10) Patent No.: US 8,031,442 B2
(45) Date of Patent: Oct. 4, 2011

(54) MAGNETIC HEAD HAVING CPP SENSOR WITH IMPROVED BIASING FOR FREE MAGNETIC LAYER

(75) Inventor: Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1098 days.

(21) Appl. No.: 11/888,733

(22) Filed: Aug. 1, 2007

(65) Prior Publication Data
US 2009/0034126 A1    Feb. 5, 2009

(51) Int. Cl.
*G11B 5/33* (2006.01)
*G11B 5/127* (2006.01)

(52) U.S. Cl. .................. 360/324.1; 360/324.12
(58) Field of Classification Search .. 360/324.1–324.12, 360/327.1–327.23
See application file for complete search history.

(56) References Cited

U.S. PATENT DOCUMENTS

| | | | |
|---|---|---|---|
| 5,546,254 A * | 8/1996 | Gill | 360/327.31 |
| 5,654,854 A * | 8/1997 | Mallary | 360/327.3 |
| 5,729,410 A | 3/1998 | Fontana, Jr. et al. | |
| 5,905,611 A | 5/1999 | Yoda et al. | |
| 6,005,753 A | 12/1999 | Fontana, Jr. et al. | |
| 6,344,954 B1 | 2/2002 | Redon et al. | |
| 6,563,679 B1 * | 5/2003 | Li et al. | 360/324 |
| 6,724,582 B2 | 4/2004 | Funayama et al. | |
| 6,762,915 B2 | 7/2004 | Pokhil et al. | |
| 6,943,998 B2 * | 9/2005 | Shimazawa et al. | 360/324.2 |
| 7,046,487 B2 | 5/2006 | Terunuma | |
| 2001/0033464 A1 * | 10/2001 | Shimazawa et al. | 360/324.2 |
| 2004/0061986 A1 | 4/2004 | Kagami et al. | |
| 2004/0114285 A1 * | 6/2004 | Ishikawa et al. | 360/324.12 |
| 2004/0207960 A1 * | 10/2004 | Saito et al. | 360/324.1 |
| 2004/0207962 A1 | 10/2004 | Saito et al. | |
| 2005/0195536 A1 | 9/2005 | Kagami et al. | |
| 2005/0270703 A1 | 12/2005 | Hayakawa et al. | |
| 2008/0239582 A1 * | 10/2008 | Kanaya et al. | 360/313 |

FOREIGN PATENT DOCUMENTS
JP    10335714    12/1998

* cited by examiner

*Primary Examiner* — Daniell L Negron
*Assistant Examiner* — Adam B Dravininkas
(74) *Attorney, Agent, or Firm* — Zilka-Kotab, PC

(57) ABSTRACT

A magnetic head for a hard disk drive having a CPP read head sensor that includes a layered sensor stack including a free magnetic layer and hard bias elements that are disposed on the sides of the free magnetic layer to provide a biasing magnetization for the free magnetic layer. To increase the coercivity of the hard bias elements, and thereby improve the biasing of the magnetization of the free magnetic layer, the ratio (t/H) of the thickness t to the height H of the hard bias elements is fabricated to be within the range of from approximately 1 to approximately 1/15.

11 Claims, 2 Drawing Sheets

MAGNETIC HEAD HAVING CPP SENSOR WITH IMPROVED BIASING FOR FREE MAGNETIC LAYER

BACKGROUND OF THE INVENTION

1. Field of the Invention

Figure 1:
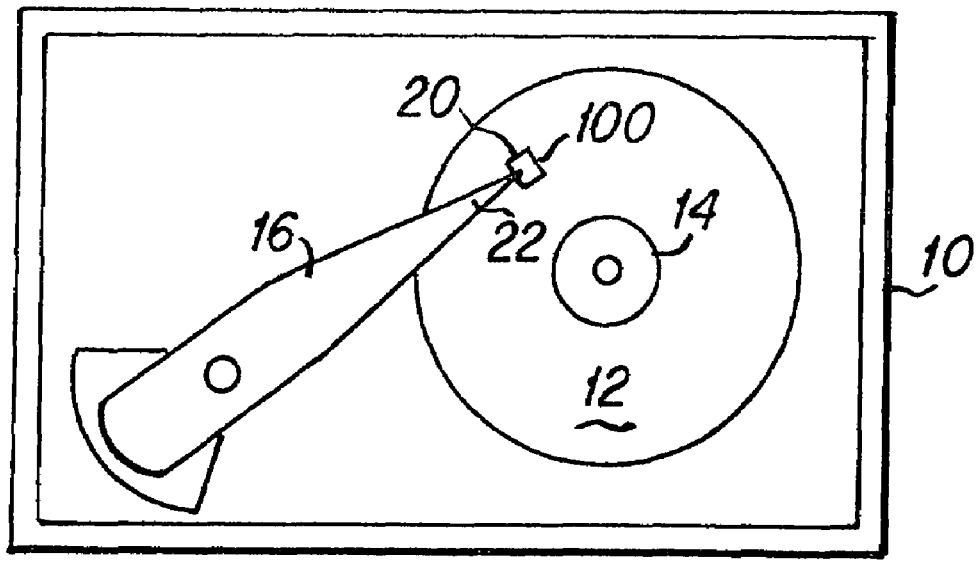

The present invention relates generally to read head portions of magnetic heads for hard disk drives and more particularly to current perpendicular to plane (CPP) tunnel junction read sensors for magnetic heads.

2. Description of the Prior Art

A computer disk drive stores and retrieves data by positioning a magnetic read/write head over a rotating magnetic data storage disk. The head reads from or writes data to concentric data tracks defined on surface of the disks. The heads are fabricated in structures called "sliders" and the slider flies above the surface of the disk on a thin cushion of air, where the surface of the slider which faces the disks is called an Air Bearing Surface (ABS).

Some recent read sensor structures use a tunnel junction sensor, also known as a "tunnel valve" for reading the magnetic field signals from the rotating magnetic data storage disk. The tunnel junction sensor typically includes a nonmagnetic tunnel barrier layer sandwiched between a pinned magnetic layer and a free magnetic layer. The pinned layer in turn is fabricated on an antiferromagnetic (AFM) pinning layer which fixes the magnetic moment of the pinned layer at an angle of 90 degrees to the air bearing surface (ABS). The magnetic moment of the free layer is free to rotate from a quiescent or zero bias point position in response to magnetic field signals from magnetic data bits written on the rotating magnetic disk. Hard bias elements are typically disposed on either side of the free magnetic layer to provide the necessary magnetization bias for the free magnetic layer. The tunnel junction sensor layers are typically disposed between first and second magnetic shield layers, where these first and second shield layers also serve as first and second electrical lead layers for conducting a sensor current through the device. The tunnel junction sensor is thus configured to conduct sensor current perpendicular to the planes (CPP) of the film layers of the sensor, as opposed to previously developed sensors where the sensor current is directed in the planes (CIP) or parallel to film layers of the sensor. The CPP configuration is attracting more attention recently, as it apparently can be made to be more sensitive than the CIP configuration, and thus is more useful in higher data density tracks and disks.

Improved hard disk drives are manufactured with an ever increasing areal data storage density, which requires narrower and more closely spaced data tracks on the hard disk. As a result, size of the read sensors must be reduced, and as the size of the sensors is reduced the stabilization of the free magnetic layer by the hard bias elements is becoming a problem. Additionally, the stabilization of the hard bias elements has also become a problem where the sensors are reduced in size.

SUMMARY OF THE INVENTION

Embodiments of the present invention provide increased stabilization of the magnetization of the hard bias element, which in turn provides increased stabilization of the magnetization of the free magnetic layer, which results in improved performance characteristics for the smaller read sensors that are utilized in higher density hard disk drives.

An embodiment of the present invention includes a magnetic head having a CPP read head sensor. The CPP sensor includes a layered sensor stack including a free magnetic layer, a tunnel barrier layer, a pinned magnetic layer and an antiferromagnetic layer. Hard bias elements are disposed on the sides of the free magnetic layer to provide a biasing magnetization for the free magnetic layer.

To increase the coercivity of the hard bias elements, and thereby improve the biasing of the magnetization of the free magnetic layer, the ratio (t/H) of the thickness t to the height H of the hard bias elements is fabricated to be within the range of from approximately 1 to approximately $\frac{1}{15}$. This is a reduction of the height (H) of the hard bias elements as compared to the prior art. This reduced height H of the hard bias elements increases the shape anisotropy of the hard bias elements, resulting in stiffness of the hard bias elements.

It is an advantage of the magnetic head of an embodiment of the present invention that it includes a CPP read sensor having improved biasing of the magnetization of the free magnetic layer.

It is another advantage of the magnetic head of an embodiment of the present invention that it includes a CPP read sensor having hard bias elements with increased magnetic stiffness.

It is a further advantage of the magnetic head of an embodiment of the present invention that it includes a CPP read sensor having hard bias elements wherein shape anisotropy is utilized to increase the magnetic stiffness of the hard bias elements.

It is an advantage of a hard disk drive of an embodiment of the present invention that it includes the magnetic head of the present invention having a CPP read sensor having hard bias elements with increased magnetic stiffness.

It is another advantage of a hard disk drive of an embodiment of the present invention that it includes the magnetic head of the present invention having a CPP read sensor having improved biasing of the magnetization of the free magnetic layer.

It is a further advantage of the hard disk drive of an embodiment of the present invention that it includes a magnetic head of the present invention that it includes a CPP read sensor having hard bias elements wherein shape anisotropy is utilized to increase the magnetic stiffness of the hard bias elements.

These and other features and advantages of embodiments of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

Figure 2:
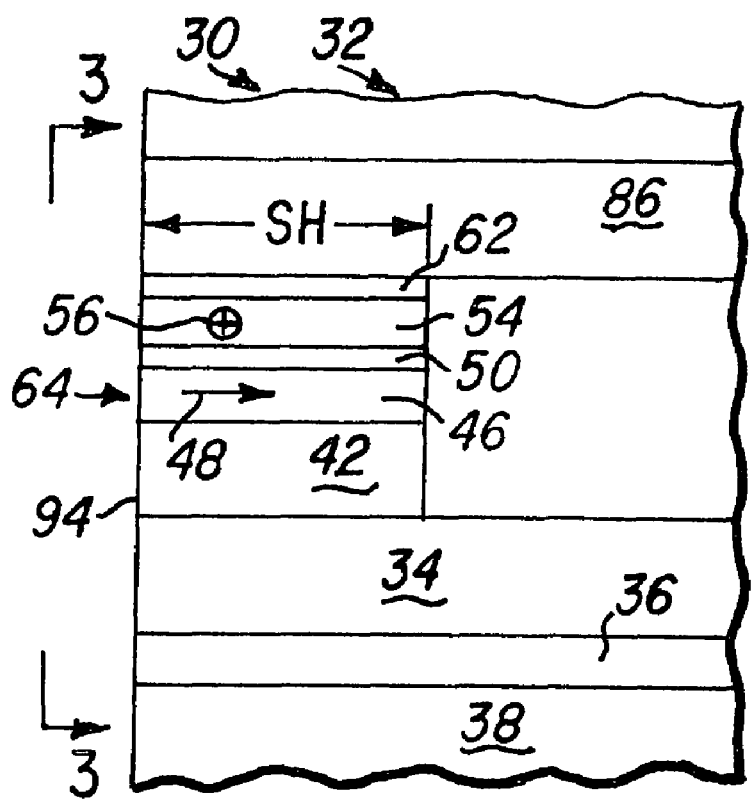
Figure 3:
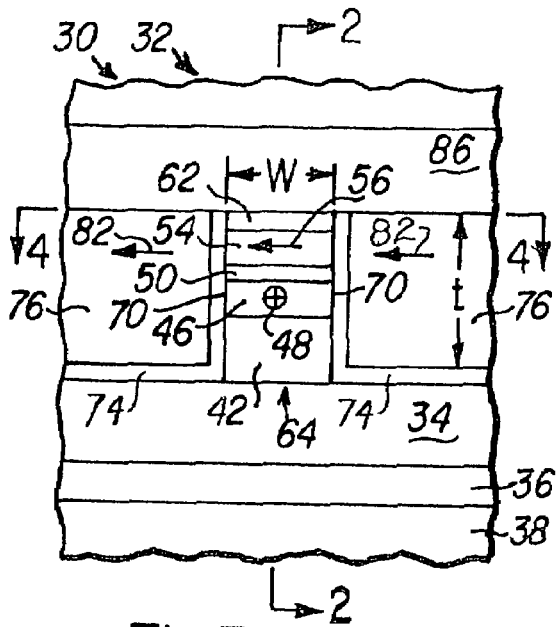
Figure 4:
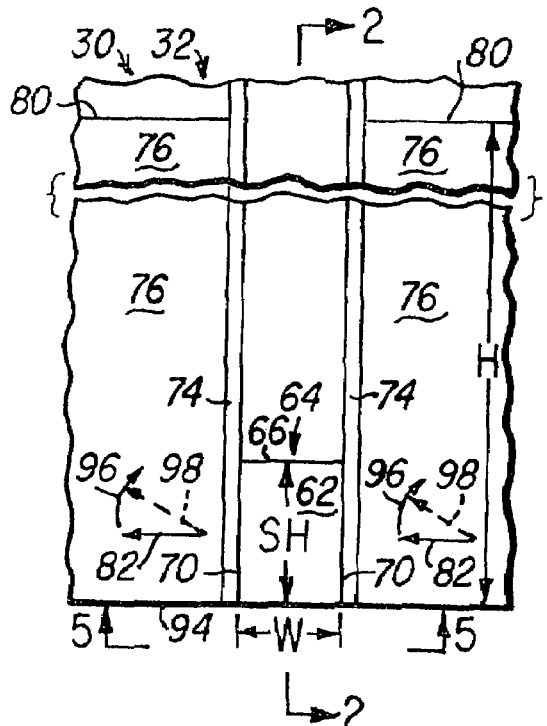
Figure 5:
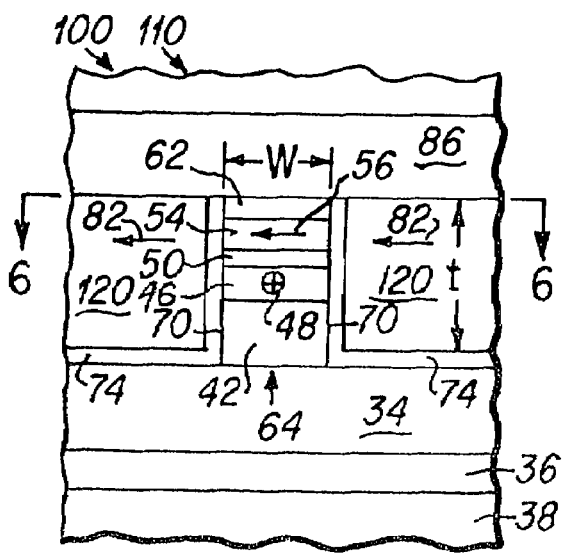
Figure 6:
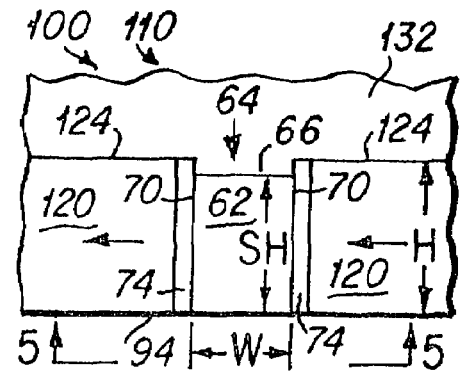

FIG. 1 is a top plan view depicting a hard disk drive of an embodiment of the present invention having a magnetic head of an embodiment of the present invention;

FIG. 2 is a side cross-sectional view of a tunnel barrier sensor portion 30 of a prior art magnetic head 32 taken along lines 2-2 of FIGS. 3 and 4;

FIG. 3 is a side elevational view of the tunnel barrier sensor 30 depicted in FIG. 2, taken from the air bearing surface of the magnetic head 32 along lines 3-3 of FIG. 2;

FIG. 4 is a top plan view depicting the tunnel barrier sensor portion 30 of the prior art magnetic head 32 taken along lines 4-4 of FIG. 3;

FIG. 5 is a side elevational view of the tunnel barrier sensor of a magnetic head of an embodiment of the present invention taken from the air bearing surface of the magnetic head; and FIG. 6 is a top plan view depicting the tunnel barrier sensor portion of the magnetic head of an embodiment of the present invention taken along lines 6-6 of FIG. 5.

DETAILED DESCRIPTION OF EMBODIMENTS

FIG. 1 is a top plan view that depicts significant components of a hard disk drive 10 of the present invention which includes the magnetic head of an embodiment of the present invention. The hard disk drive 10 includes a magnetic hard disk 12 that is rotatably mounted upon a motorized spindle 14. An actuator arm 16 is pivotally mounted within the hard disk drive 10 with a slider device 20 having a magnetic head 100 of an embodiment of the present invention disposed upon a distal end 22 of the actuator arm 16. A typical hard disk drive 10 may include a plurality of disks 12 that are rotatably mounted upon the spindle 14 and a plurality of actuator arms 16 having a plurality of sliders 20 mounted upon the distal ends 22 of the plurality of the actuator arms 16. As is well known to those skilled in the art, when a hard disk drive is operated, the hard disk 12 rotates upon the spindle 14 and the slider acts as an air bearing that is adapted for flying above the surface of the rotating disk. The slider includes a substrate base upon which various layers and structures that form the magnetic head 100 are fabricated. Such sliders with their magnetic heads are typically fabricated in large quantities upon a wafer substrate and subsequently sliced into discrete devices.

A typical magnetic head will include both a read head portion and a write head portion. The read head portion is utilized to read data that has been written upon the hard disk 12, and the write head portion is utilized to write data to the disk 12. Read head sensors are generally of two types, current-in-plane (CIP) and current-perpendicular-to-plane (CPP) as is well known to those skilled in the art. Embodiments of the present invention are directed to the read head portion of a magnetic head, and particularly to such read heads that include a CPP sensor, which includes sensors that may have a tunnel barrier structure, as is next described with aid of FIGS. 2, 3 and 4.

FIG. 2 is a side cross-sectional view of a tunnel barrier sensor portion 30 of a prior art magnetic head 32 taken along lines 2-2 of FIGS. 3 and 4, FIG. 3 is a side elevational view of the tunnel barrier sensor 30 depicted in FIG. 2, taken from the air bearing surface of the magnetic head 32 along lines 3-3 of FIG. 2, and FIG. 4 is a top plan view depicting the tunnel barrier sensor portion 30 of the prior art magnetic head 32 taken along lines 4-4 of FIG. 3. As is best seen in FIGS. 2 and 3, the tunnel barrier sensor 30 includes a plurality of thin film layers. These layers include a first magnetic shield layer 34 that is fabricated upon or over an electrical insulation layer 36 that is deposited upon a wafer substrate 38. While many different layered sensor structures are known in the prior art, a typical sensor layer structure will include an antiferromagnetic layer 42 which may be comprised of a Pt—Mn or Ir—Mn alloy that is fabricated upon or over the first magnetic shield layer 34. A pinned magnetic layer 46 is fabricated upon or over the antiferromagnetic layer 42, and it may be comprised of a magnetic material such as a Co—Fe alloy. The direction of magnetization of the pinned magnetic layer (see arrow 48) is generally perpendicular to the air bearing surface (ABS) of the magnetic head.

Thereafter, a tunnel barrier layer 50 is fabricated upon or over the pinned magnetic layer 46, where the tunnel barrier layer 50 may be comprised of an electrical insulation material such as $MgO_x$, $TiO_x$ and $AlO_x$ where the subscript x indicates that the oxide need not be stoichiometric. In alternative CPP sensor embodiments, the CPP sensor may be of the GMR type, wherein the layer above the pinned magnetic layer is electrically conductive, such as copper. However, for purposes of description, a CPP sensor with a tunnel barrier layer will be described herein, it being understood that the novel features of the present invention are equally applicable to such CPP GMR sensors.

A free magnetic layer 54 is then fabricated upon or over the tunnel barrier layer 50, where the free magnetic layer 54 may be composed of a magnetic material such as a Co—Fe alloy or a Ni—Fe alloy. The direction of magnetization of the free magnetic layer (see arrow 56) is nominally in the plane of the free magnetic layer, however it is free to rotate in response to the magnetic field of magnetic data bits of the disk 12. Thereafter, a cap layer 62 is typically fabricated upon or over the free magnetic layer 54, and a typical cap layer may be comprised of a material such as tantalum and/or ruthenium. As can be best understood with the aid of FIGS. 3 and 4, the layers 42-62 are then masked and ion milled in a plurality of steps to create a central sensor stack 64 having a back wall 66 and side walls 70. As seen in the top plan view of FIG. 4, the distance W between the side walls 70 of the sensor 30 defines the read width of the sensor.

Following the ion milling steps for creating the back wall 66 and side walls 70, a thin layer of electrical insulation 74 is next deposited upon or over the device, particularly upon the side walls 70, utilizing a process such as atomic layer deposition (ALD). Thereafter, magnetic hard bias elements 76, typically composed of a material such as a Co—Pt alloy, are fabricated upon the insulation layer 74 proximate the side walls 70. The back edge 80 of the hard bias elements 76 extends significantly beyond the back wall 66 of the sensor stack. The direction of magnetization of the hard bias elements (see arrows 82) is desirably in the same direction as the magnetization 56 of the free magnetic layer, in that the magnetization of the hard bias element stabilizes the free magnetic layer 54. A second magnetic shield 86 is then fabricated upon the cap layer 62 and hard bias elements 76. In fabricating the head 32, following the fabrication of the read head structures, and following subsequent fabrication steps to create write head structures (not shown), an air bearing surface (ABS) 94 is created. The distance between the ABS 94 and the back wall 66 of the sensor stack is termed the stripe height (SH) of the sensor, and in this application the distance between the ABS and the back edge 80 of the hard bias elements will be termed the height (H) of the hard bias elements.

A magnetic head including a tunnel barrier sensor 30 operates by the passage of electrical sensor current from the first magnetic shield 34, through the sensor layers 42-62 and into the second magnetic shield 86, such that the current travels perpendicular to the planes (CPP) of the layers 42-62. The electrical insulation layer 74 serves to guide the sensor current through the sensor layers. The tunnel barrier sensor, such as is depicted in FIGS. 2-4 operates by detecting magnetic data bits written upon the hard disk 12 through a change in electrical resistance within the sensor when the sensor is exposed to the magnetic field of the data bit. Specifically, the direction 56 of the free layer magnetization is altered by the magnetic field of a data bit, and the change in the direction of the free layer magnetization creates a change in the electrical resistance of the sensor. This change in the resistance then affects the electrical current flowing through the sensor, and the change in sensor current flow is detected and interpreted as a data signal. The biasing magnetic field 82 from the hard bias elements serves to urge the direction of magnetization 56 of the free magnetic layer to its nominal direction shown in FIGS. 2-4. The operational characteristics of tunnel barrier sensors are well known to those skilled in the art, and a more detailed description thereof is not deemed necessary in order to fully describe the features of the present invention.

Improved hard disk drives are manufactured with an ever increasing areal data storage density, which requires narrower and more closely spaced data tracks on the hard disk and a higher bits per inch (BPI) in the data tracks. As a result, the size of the MR sensors must be reduced, and as the size of the MR sensors is reduced the stabilization of the free magnetic layer by the hard bias elements is becoming a problem. Additionally, the stabilization of the hard bias elements also becomes a problem when the magnetic heads are reduced in size. Particularly, as is depicted in FIG. 4, where the hard bias elements are reduced in size, the direction of magnetization 82 can rotate (see arrow 96) in response to external magnetic fields or other events that the magnetic head may encounter. Where the direction of magnetization of the hard bias elements is altered (such as arrow 98) the biasing of the free magnetic layer 54 is detrimentally affected, and the performance of the CPP sensor may be significantly diminished. As indicated herebelow, the present invention provides improved stabilization of the magnetic properties of the hard bias elements, thereby providing improved stabilization to the free magnetic layer. As will be seen, the improved stabilization of the hard bias elements is achieved through improved shape anisotropy which enhances the coercivity and stiffness of the hard bias magnetization, as is next described.

The improved magnetic head 100 of the present invention, including an improved CPP sensor 110, is depicted in FIGS. 5 and 6, in which FIG. 5 is an elevational view taken from the air bearing surface of the magnetic head 100, and FIG. 6 is a plan view taken from lines 6-6 of FIG. 5. As will be understood when reading the following description, the significant difference between the magnetic head 100 of the present invention and the prior art magnetic head 32 is the shape of the hard bias elements 120 that are fabricated on either side of the CPP sensor stack 64. Therefore, the magnetic head 100 of the present invention includes many features and structures that are substantially similar to those of the prior art magnetic head 32, and such similar structures have been identically numbered for ease of comprehension.

As can be seen in FIG. 5, the CPP sensor 110 includes a plurality of thin film layers. These layers include a first magnetic shield layer 34 that is fabricated upon an electrical insulation layer 36 that is deposited upon a wafer substrate 38. While many different layered sensor structures are known in the prior art, a typical sensor layer structure will include an antiferromagnetic layer 42 which may be comprised of a Pt—Mn or Ir—Mn alloy that is fabricated upon the first magnetic shield layer 34. A pinned magnetic layer 46 is fabricated upon the antiferromagnetic layer 42, and it may be comprised of a magnetic material such as a Co—Fe alloy. The direction of magnetization of the pinned magnetic layer (see arrow 48) is generally perpendicular to the air bearing surface (ABS) of the magnetic head. Thereafter, a tunnel barrier layer 50 is fabricated upon the pinned magnetic layer 46, where the tunnel barrier layer 50 may be comprised of an electrical insulation material such as $MgO_x$, $TiO_x$ and $AlO_x$ where the subscript x indicates that the oxide need not be stoichiometric. In alternative CPP sensor embodiments of the present invention, the CPP sensor may be of the GMR type, wherein the layer above the pinned magnetic layer is electrically conductive, such as copper. However, for purposes of description, a CPP sensor with a tunnel barrier layer will be described herein, it being understood that the novel features of the present invention are equally applicable to such CPP GMR sensors.

A free magnetic layer 54 is then fabricated upon the tunnel barrier layer 50, where the free magnetic layer 54 may be composed of a magnetic material such as a Co—Fe alloy or a Ni—Fe alloy. The direction of magnetization of the free magnetic layer (see arrow 56) is nominally in the plane of the free magnetic layer, however it is free to rotate in response to the magnetic field of magnetic data bits of the disk 12. Thereafter, a cap layer 62 is typically fabricated upon the free magnetic layer 54, and a typical cap layer may be comprised of a material such as tantalum and/or ruthenium. The layers 42-62 are then masked and ion milled in a plurality of steps to create a central sensor stack 64 having a back wall 66 and side walls 70. The distance W between the side walls 70 of the sensor 110 defines the read width of the sensor.

A thin layer of electrical insulation 74 is next deposited upon the device, particularly upon the side walls 70, utilizing a process such as atomic layer deposition (ALD). Thereafter, magnetic hard bias elements 120, typically composed of a material such as a Co—Pt alloy, are fabricated upon the insulation layer 74 proximate the side walls 70. The height H of the hard bias elements is reduced as compared to the prior art, and it is shown by way of example in FIG. 6 where the back wall 124 is approximately in the same location as the back wall 66 of the sensor stack 64, such that the height H of the hard bias elements 120 is approximately equal to the stripe height (SH) of the sensor stack. A second magnetic shield 86 is subsequently fabricated upon the cap layer 62 and hard bias elements 120. Following the fabrication of the read head structures, and following subsequent fabrication steps to create write head structures (not shown), an air bearing surface (ABS) 94 is created. The distance between the ABS 94 and the back wall 66 of the sensor stack is the stripe height (SH) of the sensor, and the distance between the ABS 94 and the back wall 124 of the hard bias elements 120 is the height (H) of the hard bias elements.

The significant features of the present invention are best understood by comparing the depiction of the present invention in FIG. 6 with the depiction of the prior art magnetic head shown in FIG. 4. As can be seen in FIG. 6, the height of the hard bias elements 120 is substantially reduced from the height of the hard bias elements 76 as is known in the prior art. Specifically, as can be seen in FIG. 6, the preferred height H of the hard bias elements 120 may be, though not necessarily, approximately the same as the stripe height SH of the sensor stack.

The stabilization of the magnetization of the hard bias elements is controlled by the coercivity of the hard bias magnetic material. The present invention utilizes the shape anisotropy to enhance the hard bias coercivity and stiffness. This can be important for hard bias element materials which have excellent squareness but somewhat lower coercivity of approximately 800 to 1200 Oe. Even current hard bias materials with 1400 to 1800 Oe coercivity can generally benefit from the shape anisotropy improvement of the present invention. Assuming a 30 nm thick (t) hard bias element with a 60 to 90 nm height H and approximately 1 um length, the shape anisotropy related coercivity of the hard bias element can be as much as 5000 Oe as is shown below. The shape related coercivity Hk of a hard bias element can be stated as:

$$H_k = 4\pi M s t / H.$$

Where $4\pi Ms$ is approximately 10000, and t=30 nm, it can be seen that;

$H_k$=5000 Oe. for H=60 nm; and
$H_k$=3300 Oe. for H=90 nm.

Thus, even for a 90 nm hard bias height H, the shape anisotropy related coercivity is around 3000 Oe which is about twice as much as the coercivity of the hard bias magnet material itself. This invention thus improves the coercivity of the hard bias elements by altering the shape anisotropy of the hard bias elements, and makes the hard bias element's magnetization stable against any large disturbing magnetic fields.

In a preferred embodiment of the present invention, where the thickness t can be from approximately 5 nm to approximately 60 nm, the thickness/height ratio (t/H) of the hard bias elements is preferably within the range of from approximately 1 to approximately 1/15, with a preferred range of approximately 1/2 to approximately 1/10. As compared to the stripe height SH of the sensor stack, where SH can be from approximately 10 nm to approximately 100 nm, the height H of the hard bias elements is preferably within the range of from approximately equal to the stripe height SH to approximately three times the stripe height SH. Hard bias elements that are fabricated within these ranges will generally have increased coercivity due to shape anisotropy that provides an increased biasing of the free magnetic layer magnetization. As magnetic heads are reduced in size for use in hard disk drives having increased areal data storage density, the improved biasing of the magnetization of the free magnetic layer creates improved performance characteristics of magnetic heads of the present invention.

The fabrication of the improved hard bias elements can be accomplished in many different ways, as will be understood by those skilled in the art. One such method is to fabricate the magnetic head utilizing the identical fabrication steps that are known in the prior art to the fabrication stage in which the hard bias elements 76 are fabricated with the large height as depicted in FIG. 4. Thereafter, in a new process step, a milling mask is fabricated to cover the sensor and the desirable portions of the hard bias elements. Thereafter, in an ion milling step, the undesirable extended portions of the hard bias elements are removed. Thereafter, an insulative fill material 132 is deposited and the milling mask is removed. Alternatively, the magnetic head 100 of the present invention can be fabricated in a method wherein a first milling step is conducted in which the sidewalls of the central stack are created. This is followed by the deposition of the insulation layer 74, followed by the deposition of the extended hard bias elements (such as 76 in FIG. 4). Thereafter, the stripe height SH of the sensor and the height H of the hard bias elements 110 are simultaneously created utilizing a milling mask that covers the desired portions of the sensor stack and the hard bias elements. An ion milling step is then conducted to remove unmasked portions of the hard bias elements 110 and the sensor stack, such that the stripe height SH of the sensor stack and the height H of the hard bias element are simultaneously created in this milling step. Fill material 132 is thereafter deposited.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

I claim:

1. A magnetic head, comprising:
    a CPP read sensor including a plurality of sensor layers, wherein said sensor layers are formed with an air bearing surface (ABS), side edges and a back edge that defines a sensor stripe height SH between the ABS and said back edge;
    hard bias elements being disposed proximate said side edges, said hard bias elements having a height H and a thickness t, wherein the ratio of t/H is from approximately 1 to approximately 1/15;
    an insulating layer extending around a corner of each of the hard bias elements and along a bottom and side of the hard bias element closest the side edges and defining the corner; and
    a magnetic shield formed directly on the hard bias elements.

2. A magnetic head as described in claim 1 wherein t is within the range of from approximately 5 nm to approximately 60 mm.

3. A magnetic head as described in claim 1 wherein H is within the range of approximately SH to approximately 3 SH.

4. A magnetic head as described in claim 3, wherein SH is within the range of from approximately 10 nm to approximately 100 nm.

5. A magnetic head as described in claim 1 wherein H is within the range of from approximately 20 nm to approximately 300 nm.

6. A hard disk drive, comprising:
    a rotatable hard disk;
    a magnetic head as recited in claim 1, said magnetic head being disposed for reading data from said hard disk.

7. A hard disk drive, comprising:
    a rotatable hard disk;
    a magnetic head being disposed for reading data from said hard disk, said magnetic head, including:
    a CPP read sensor including a plurality of sensor layers, wherein said sensor layers are formed with an air bearing surface (ABS), side edges and a back edge that defines a sensor stripe height SH between the ABS and said back edge;
    hard bias elements being disposed proximate said side edges, said hard bias elements having a height H and a thickness t, wherein the ratio of t/H is from approximately 1 to approximately 1/15;
    an insulating layer extending around a corner of each of the hard bias elements and along a bottom and side of the hard bias element closest the side edges and defining the corner; and
    a magnetic shield formed directly on the hard bias elements.

8. A hard disk drive as described in claim 7 wherein t is within the range of from approximately 5 nm to approximately 60 nm.

9. A hard disk drive as described in claim 7 wherein H is within the range of approximately SH to approximately 3 SH.

10. A hard disk drive as described in claim 9, wherein SH is within the range of from approximately 10 nm to approximately 100 nm.

11. A hard disk drive as described in claim 7 wherein H is within the range of from approximately 20 nm to approximately 300 nm.

* * * * *